United States Patent [19]
Hayashi

[11] Patent Number: 5,829,014
[45] Date of Patent: Oct. 27, 1998

[54] METHOD OF SUPERVISING STORAGE OF DATA IN A MEMORY CARD HAVING EEPROM AND A MEMORY CARD SYSTEM USING THE SAME

[75] Inventor: Kenkichi Hayashi, Tokyo, Japan

[73] Assignee: Fuji Photo Film Co., Ltd., Kanagawa, Japan

[21] Appl. No.: 808,859

[22] Filed: Feb. 28, 1997

Related U.S. Application Data

[63] Continuation of Ser. No. 499,043, Jul. 6, 1995, abandoned, which is a continuation of Ser. No. 857,504, Mar. 25, 1992, abandoned.

[30] Foreign Application Priority Data

Apr. 4, 1991 [JP] Japan ................................. 3-097867

[51] Int. Cl.$^6$ ............................................. G06F 13/00
[52] U.S. Cl. ............................................................ 711/103
[58] Field of Search ................................................ 711/103

[56] References Cited

U.S. PATENT DOCUMENTS

| | | | |
|---|---|---|---|
| 4,652,939 | 3/1987 | Baumseister | 358/342 |
| 4,660,101 | 4/1987 | Martin | 358/342 |
| 4,675,755 | 6/1987 | Baumeister et al. | 360/35.1 |
| 4,685,001 | 8/1987 | Martin | 358/342 |
| 4,717,971 | 1/1988 | Sawyer | 358/342 |
| 4,874,935 | 10/1989 | Younger | 235/492 |
| 4,887,234 | 12/1989 | Iijima | 364/900 |
| 5,018,017 | 5/1991 | Sasaki et al. | 358/209 |
| 5,034,804 | 7/1991 | Sasaki et al. | 358/41 |
| 5,068,744 | 11/1991 | Ito | 358/310 |
| 5,077,612 | 12/1991 | Megrgardt et al. | 358/209 |
| 5,153,729 | 10/1992 | Saito | 358/209 |
| 5,153,730 | 10/1992 | Nagasaki et al. | 358/209 |
| 5,231,514 | 7/1993 | Nakamura | 358/444 |
| 5,454,096 | 9/1995 | Otsuka et al. | 395/401 |

FOREIGN PATENT DOCUMENTS

| | | |
|---|---|---|
| 3187689 | 8/1991 | Japan . |
| 3232029 | 10/1991 | Japan . |

*Primary Examiner*—David L. Robertson

[57] ABSTRACT

A method of supervising the storage of picture data, character data or similar data in a memory card having an EEPROM (Electrically Erasable Programmable Read Only Memory) and a memory card system using the same. When the EEPROM in an initialized state, a controller formats it into a data area made up of a plurality of data subareas and a directory area made up of a plurality of supervisory subareas each being associated with respective one of the data subareas. In the event of writing data in any one of the data subareas, the controller writes a serial number or similar occupancy code at the leading field of one supervisory subarea corresponding to the data subarea of interest. The leading field of each supervisory subarea remains in the initialized state until the occupancy code has been written thereto.

15 Claims, 6 Drawing Sheets

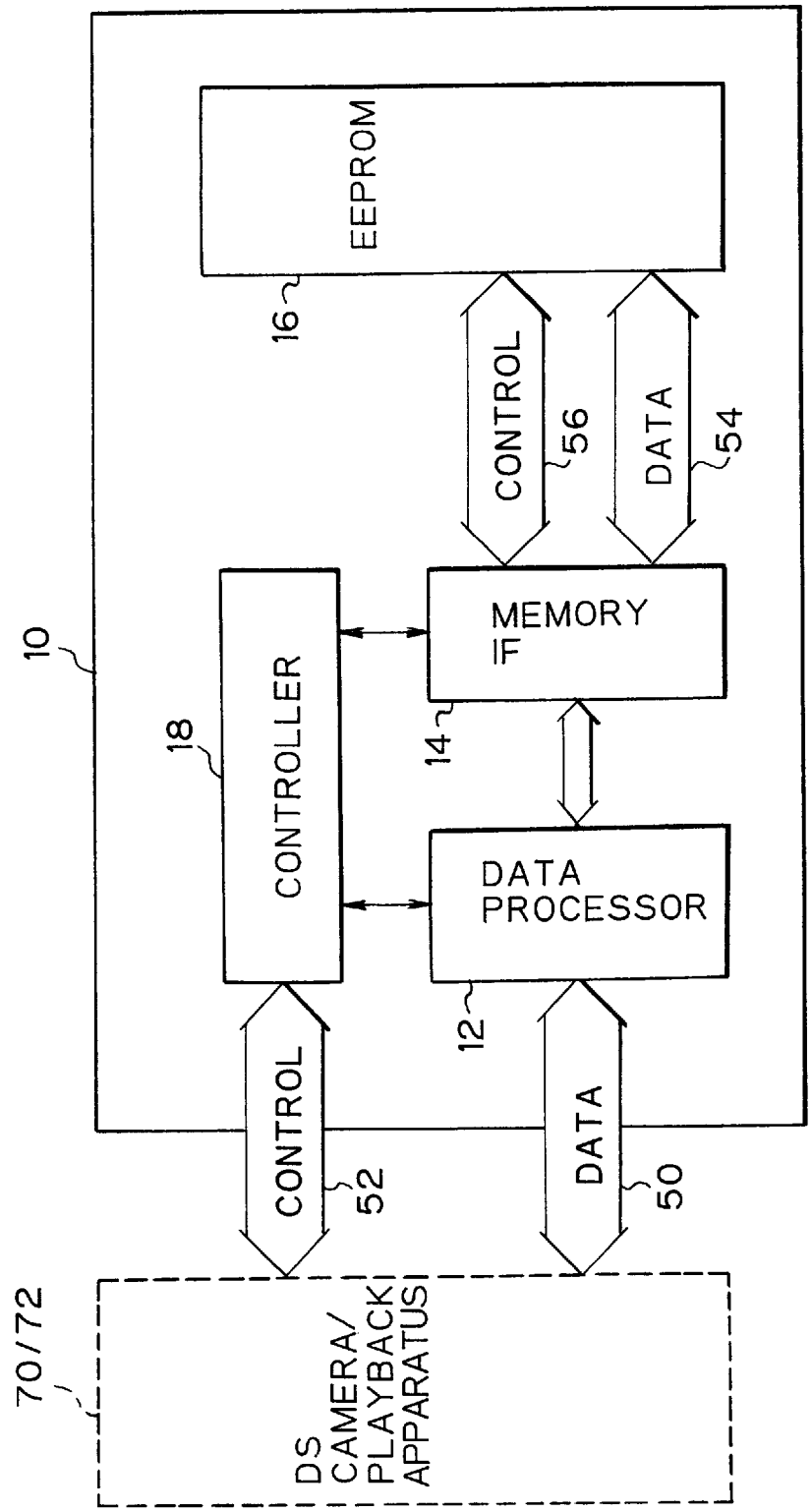

METHOD OF SUPERVISING STORAGE OF DATA IN A MEMORY CARD HAVING EEPROM AND A MEMORY CARD SYSTEM USING THE SAME

This application is a continuation of application Ser. No. 08/499,043, filed on Jul. 6, 1995, now abandoned; which was a continuation of Ser. No. 07/857,504, filed on Mar. 25, 1992, now abandoned.

BACKGROUND OF THE INVENTION

1. Field of the Invention

The present invention relates to a method of controlling the storage of picture data, character data or similar data in a memory card having an EEPROM (Electrically Erasable Programmable Read Only Memory) and a memory card system using the same.

2. Description of the Prior Art

Today, a memory card using a semiconductor memory is predominant over a floppy disk or disket as means for recording data such as picture data generated by an electronic still camera or character data generated by a word processor, since the former is far smaller in size than the latter. It has been customary with a memory card for such an application to implement the semiconductor memory as an SRAM (Static Random Access Memory) which promotes rapid data reading and writing operations. However, since an SRAM is a volatile semiconductor memory, a memory card with an SRAM needs a back-up battery for preventing data from disappearing. Another problem is that an SRAM capable of storing a great amount of data such as picture data is expensive, increasing the overall cost of a memory card implemented thereby.

In light of the above, a memory card with an EEPROM which is nonvolatile and, therefore, does not need a back-up battery and is inexpensive is now under investigation. An EEPROM is capable of holding data therein for more than ten years without a battery. Some advanced EEPROMs are comparable with an SRAM in respect of the reading and writing rates and are as inexpensive as about one-fourth of an SRAM.

Various kinds of storage supervising methods for a memory card or similar storing medium have heretofore been proposed for enhancing efficient reading and writing of data. For example, a storage supervising method applicable to a memory card and a storage supervising method practicable with picture recording and reproducing apparatuses are disclosed in U.S. Pat. Nos. 5,226,145 and 5,682,202, respectively. It is a common practice with the conventional storage supervising methods to record supervisory information associated with data in a recording medium together with the data. Such a method reads data out of the recording medium by referencing the supervisory information or writes data in the medium after finding an unoccupied area by referencing the supervisory information. After writing data, the system rewrites the supervisory information and then writes the resulting supervisory information in the recording medium.

However, none of the conventional recording methods is directly applicable to a memory card using an EEPROM since they have to write supervisory information every time they write data. A flushing type EEPROM, among others, collectively erases a block of predetermined volume of data or all the existing data at a time although it allows data to be written byte by byte therein. Specifically, when only one of supervisory information stored in this type of EEPROM is rewritten, all the other supervisory information are erased also. With a flushing type EEPROM, therefore, it is impossible to rewrite supervisory information efficiently.

To eliminate the above problem, the system with which the storage supervising method is practicable may be constructed to once read out supervisory information and data existing in a flushing type EEPRPOM and temporarily store the supervisory information and data in the system, then erase the EEPROM while updating the supervisory information, and then write the updated supervisory information in the EEPROM together with the data. This, however, forces the system to execute a complicated procedure, i.e., reading and storing all the data and information to be erased, updating the supervisory information relating to data writing, erasing the EEPROM, and then writing all the supervisory information including the updated one and data in the memory card. In addition, the system has to bear a heavy load in effecting the control. Moreover, the system needs a back-up memory and a circuit for rewriting the contents of the back-up memory, aggravating the complicacy of circuitry. This is also true with a memory card adapted to execute such a procedure within the card.

SUMMARY OF THE INVENTION

It is, therefore, an object of the present invention to provide a storage supervising method capable of writing supervisory data in a memory card efficiently even when the card is implemented with a flash type EEPROM, and a memory card system using the same.

It is another object of the present invention to provide a storage supervising method for a memory card which reduces the load on and simplifies the circuitry of a system even when the card uses a flash type EEPROM, and a memory card system using the same.

In accordance with the present invention, a method of supervising the storage of data and supervisory information associated with the data in a memory card having an EEPROM as a memory device comprises the steps of forming in the EEPROM a data area made up of a plurality of data subareas for storing data and a directory area made up of a plurality of supervisory subareas associated one-to-one with said plurality of data subareas for storing supervisory information in an initialized state wherein all the contents of the EEPROM have the same value, forming in each of the plurality of supervisory subareas an identification (ID) field for writing an occupancy code which remains in the initialized state until data has been written to one of the plurality of data subareas corresponding to the supervisory subarea or assumes a state different from the initialized state when data is written to the one data subarea to show that the data subarea is occupied, and reading or writing data in or out of any one of the plurality of data subareas after determining whether or not the occupancy code has been written to the ID field associated with the one data subarea.

Also, in accordance with the present invention, a memory card system for controlling a memory card having an EEPROM as a memory device comprises a data converting circuit for converting data generated by a data recording device to a predetermined data format which can be stored in the EEPROM or reconverting data read out of the EEPROM to a predetermined data format which can be reproduced by a data reproducing device, an interface for interfacing the data converting circuit to the EEPROM for transferring data converted by the data converting circuit to the EEPROM or transferring data read out of the EEPROM to the data converting circuit, and a controller for controlling the data converting circuit and interface for writing data in the EEPROM or reading data out of the EEPROM. In the event of writing data in the EEPROM, the controller erases the contents of the EEPROM in response to an erase command sent from the data recording device to thereby initialize the EEPROM, formats the EEPROM having been initialized into a data area made up of a plurality of data subareas and a directory area made up of a plurality of supervisory subareas each including an ID area, writes, when data is to be written to any one of the plurality of data subareas, an occupancy code having a state different from the initialized state in one of the ID fields associated with the one data area, and searches the ID fields to determine whether or not the occupancy code exists in the ID fields.

BRIEF DESCRIPTION OF THE DRAWINGS

The objects and features of the present invention will become more apparent from the consideration of the following detailed description taken in conjunction with the accompanying drawings in which:

FIG. 1 is a block diagram schematically showing a memory card for practicing a storage supervising method embodying the present invention;

DESCRIPTION OF THE PREFERRED EMBODIMENTS

Figure 2A:
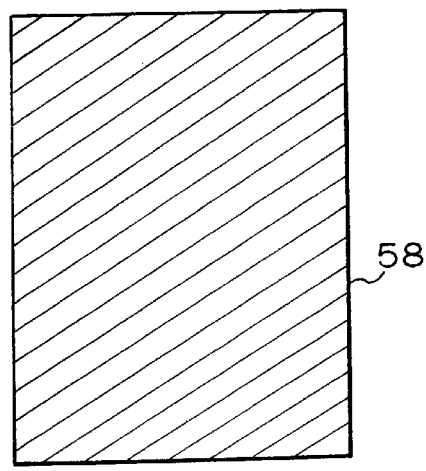
FIGS. 2A, 2B and 2C show an EEPROM included in the memory card of FIG. 1 in an initialized state, a formatted state, and an occupied state, respectively.

Referring to FIG. 1 of the drawings, a memory card for practicing a storage supervising method embodying the present invention is shown. As shown, the memory card, generally 10, has a flash type EEPROM 16 belonging to a family of semiconductor memories. The card 10 is a picture recording medium which may be mounted on a digital still (DS) camera or similar host processor 70 by data and control lines 50 and 52 to record digital picture data in the EEPROM 16. In the illustrative embodiment, the card 10 has a control section made up of a data processor 12, a memory interface 14, and a controller 18. The data processor 12 converts picture data 50 representative of a picture taken by the DS camera 70 to a predetermined data format which can be recorded in the EEPROM 16. Further, the data processor 12 transforms picture data read out of the EEPROM 16 to a data format which can be reproduced by, for example, a playback apparatus 72, which may also be connectable to the card 10 by data and control lines 50 and 52. In this sense, the data processor 12 plays the role of a data converting circuit. The memory interface 14 is an input/output (I/O) interface for transferring picture data processed by the data processor 12 to the EEPROM 16 or transferring data read out of the EEPROM 16 to the data processor 12 over a data bus 54. In addition, the memory interface 14 transfers control signals fed from the controller 18 to the EEPROM 16 over a control bus 56.

The controller 18 controls the data processor 12 and memory interface 14 to record picture data in the EEPROM 16 or to read picture data out of the EEPROM 16. Specifically, when picture data is sent from the DS camera 70 to the card 10 on the data lines 50 to be recorded in the EEPROM 16, the controller 18 causes the data processor 12 to perform data conversion by delivering a timing signal thereto. To write the picture data processed by the data processor 12 in the EEPROM 16 via the memory interface 14, the controller 18 feeds a write control signal and an address to the EEPROM 16 via the memory interface 14 over the control bus 56 in response to a control signal sent from the DS camera 70 to the card 10. After the picture data has been written to the EEPROM 16, the controller 18 once reads out the data via the memory interface 14 to verify, i.e., to see if the data has been correctly written to the EEPROM 16. On the other hand, to read data out of the EEPROM 16, the controller 18 feeds a read control signal and an address to the EEPROM 16 via the memory interface 14 over the control bus 56. At this instant, the controller 18 delivers a timing signal to the data processor 12 to cause it to reconvert the data read out via the interface 14 and feed the resulting data to the playback device on the data lines 50.

Figure 2B:
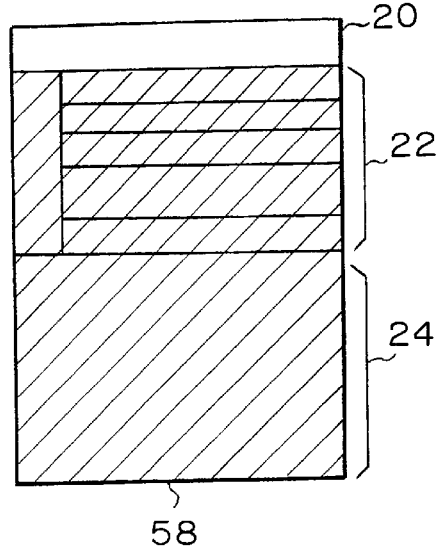

Further, in the illustrative embodiment, the controller 18 delivers an erase signal to the EEPROM 16, formats the EEPROM 16 at an initial stage, and executes various kinds of control relating to the supervision of the contents of the EEPROM 16, e.g., the search of a directory area 22 of the EEPROM 16 and the write-in of serial numbers. Specifically, when the card 10 is mounted on the DS camera 70, the controller 18 receives an erase command from the camera 70 and, in response, delivers an erase signal to the EEPROM 16 via the interface 14. Then, all the contents of the storage area 58 of the EEPROM 16 are erased and replaced with a hexadecimal state "FFFF", i.e., all binary ONEs, as shown by hatching in FIG. 2A. The controller 18 formats the storage area 58 of the EEPROM 16 in such an initialized state into a header area 20, a directory area 22, and a data area 24, as shown in FIG. 2B. In the event of writing data in the EEPROM 16, the controller 18 searches the directory area 22 to find unoccupied supervisory subareas, which will be described, and sequentially writes serial numbers in such subareas.

Figure 2C:
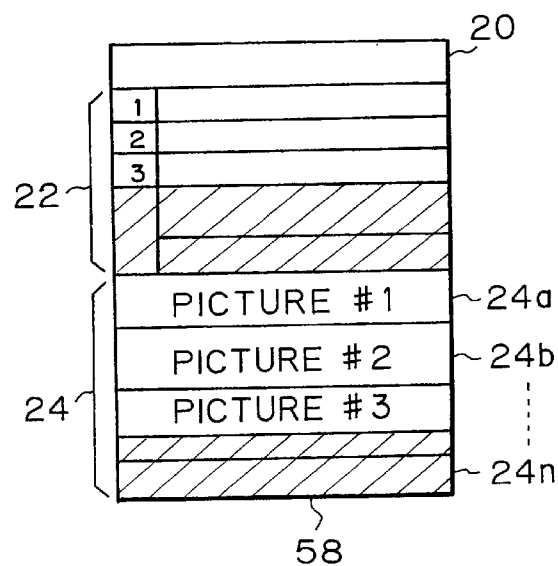

In detail, as shown in FIGS. 2B and 2C, the data area 24 formatted in the storage area 58 of the EEPROM 16 is subdivided into a plurality of data subareas $24a, 24b, \ldots, 24n$ for storing picture data sent from the DS camera 70. In those figures, unoccupied subareas, e.g., $24n$, are indicated with hatching. The data subareas $24a$–$24n$ are each implemented as a minimum unit of storage supervision, e.g., a cluster in which the entire or part of picture data representative of a single picture can be stored. Usually, data representative of one picture is stored in one subarea or cluster, as shown in FIG. 2C. A volume of picture data exceeding the capacity of one cluster is written to two or more of the clusters $24a$–$24n$. The header area 20 forms a supervisory area together with the directory area 20 and mainly stores fixed supervisory or management information which does not have to be rewritten, e.g., a title given to the card 10, the size of the card 10, an error map pointing faulty locations of the data area 24, and a parity check.

Figure 3:
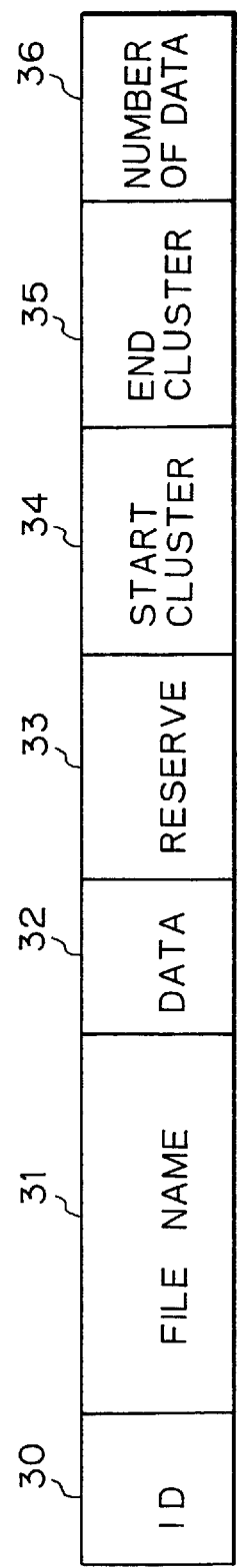
FIG. 3 shows a specific format of a supervisory subarea included in a directory area which is formed in the EEPROM by the embodiment.

The directory area 22 is made up of a plurality of supervisory subareas for data supervision which are associated with the data subareas or clusters $24a$–$24n$ of the data area 24. Usually, the supervisory subareas are each assigned to one of the clusters $24a$–$24n$. However, when picture data representative of one picture is too great in volume to be stored in one cluster, one supervisory subarea is assigned to a plurality of clusters. FIG. 3 shows a specific format of one supervisory subarea included in the directory area 22. As shown, an identification (ID) field 30 is provided at the leading end of the supervisory subarea and stores an ID code representative of a picture or a serial number, directory number or similar continuous number. A particular number of bytes capable of representing the number of associated clusters in the data area 24 are allocated to the ID field 30. For example, serial hexadecimal numbers "0001" to "FFFF" each having two bytes are sequentially written to the ID fields 30 of the consecutive supersivory subareas. A serial number or similar occupancy code is written to the ID field 30 when data is written to the cluster or clusters of the data area 24 associated with the ID field 30; the initial state "FFFF" is held in the ID field 30 when the associated cluster is not occupiled. Therefore, the occupancy code written to the ID field 30 indicates which of the clusters 24a–24n in the data area 24 are occupied. If the picture data stored in any one of the clusters 24a–24n associated with the occupancy code includes a faulty portion, all the figures of the code are rewritten to ZERO, e.g., "0000". This rewriting is not of the kind needing erasure in the EEPROM 16 and sets up the all ZEROs state with no regard to the value of the occupancy code only if "0000", is overwritten. Hence, when the serial number or error code "0000" is written to the ID field 30, erasure is not effected.

A file name field 31 follows the ID field 30 and stores a name given by the user to the associated cluster of the data area 24 storing picture data, i.e., a file. Sixteen bytes are allocated to the file name field 31 to allow the user to write a file name in, for example, desired alphabets or numerals. A date area 32 is used to write the day and time when associated picture data was stored or picked up. The date of storage will substantially coincide with the date of shooting if picture data is stored every time a picture is taken. Data representative of a date is sent from the camera 70 to the card 10 via the data processor 12 at the time of storage of picture data. A reserve field 33 is an optional field usable for any desired purpose and provided with two bytes, for example. A start cluster field 34 stores the start address of the start cluster of the data area 24 which stores a top portion of picture data. An end cluster field 35 stores, when picture data is stored in a pluality of clusters, the start address or the end address of the last cluster for that picture data. When picture data is accommodated in one cluster, the same address as stored in the start cluster field 34 or the end address of the cluster is written to the end cluster field 35. The controller 18 produces such address data by calculation in response to the volume of data to be sent from the camera 70 at the time of storage and delivers them to the EEPROM 16 via the memory interface 14. Two bytes are allocated to each of the areas 33 and 34. A number-of-data field 36 stores data representative of the volume of data stored in the last cluster of a picture; when picture data representative of one picture is stored in a plurality of clusters, only the volume of data stored in the last cluster is written to the field 36. The volume of data is sent from the camera to the card 10 in the event of data storage. Two bytes are also allocated to the number-of-data field 36.

The operation of the memory card 10, i.e., the controller 18 will be described with reference to FIGS. 4 and 5.

Figure 4:
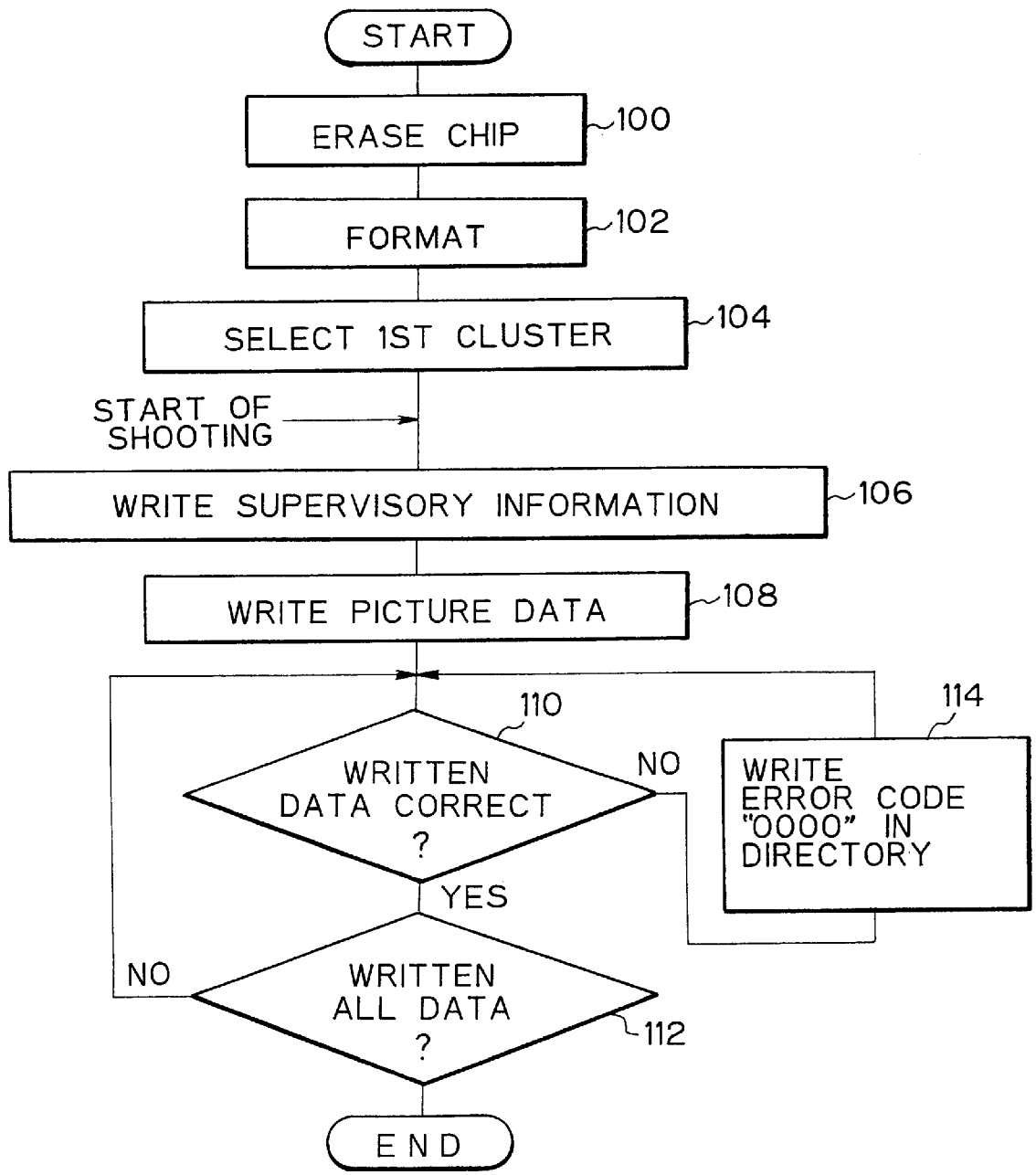
FIGS. 4 and 5 are flowcharts each showing a specific routine to be executed by the memory card shown in FIG. 1.

FIG. 4 is a flowchart demonstrating a write and erase mode operation for writing and erasing data. As the operator mounts the memory card 10 on the DS camera 70 and then presses an erase mode button provided on the camera 70, the controller 18 erases all the picture data and information existing in the EEPROM 16, i.e., erases the entire chip (step 100). Specifically, on receiving an erase command from the camera, the controller 18 delivers an erase signal to the EEPROM 16 via the memory interface 14. As a result, all the bytes of the storage area of the EEPROM 16 are changed to "FF", i.e., all ONEs, as indicated by hatching in FIG. 2A. Subsequently, the controller 18 formats the EEPROM 16 into the header area 20, directory area 22 and data area 24, as shown in FIG. 2B (step 102). At this instant, the controller 18 writes a title, memory size and other fixed supervisory information in the header area 20. It is to be noted that this step 102 is not executed if the operator does not press the erase mode button, i.e., if the step 100 is not executed. In the latter case, when a predetermined period of time elapses without depressing the erase mode button after mounting the memory card 10 on the camera 70, the controller 18 automatically reads the fixed supervisory information out of the header area 20 and then executes a step 104. In the step 104, the controller 18 selects the first cluster to store picture data. Specifically, the controller 18 scans the leading fields, i.e., ID fields 30 of the consecutive supervisory subareas of the directory area 22 to find a supervisory subarea remaining in the initial state "FFFF" and then selects a cluster associated with the supervisory area found first out of the data area 24. The camera with the memory card 10 is now ready to be operated for shooting a scene.

After shooting a scene, the operator enters a name and other information for identifying the picture on the camera 70. In response, the camera 70 sends the name, date and the volume of picture data representative of the picture to the memory card 10. Then, the controller 18 of the card 10 writes supervisory information relating to the picture data in the supervisory subarea associated with an unoccupied cluster and found first in the step 104 (step 106). Specifically, the controller 18 writes the file name, date and the volume of data respectively in the fields 31, 32 and 36 of the supervisory subarea, FIG. 3, and does not write a serial number or occupancy code, start cluster or end cluster at this stage of operation. Thereafter, the camera 70 sends picture data representative of the picture to the card 10. In response, the controller 18 writes the picture data in the EEPROM 16 (step 108). In this case, as the data processor 12 converts the input picture data to an adequate format, the controller 18 delivers the leading address of the cluster selected in the step 104 to the EEPROM 16 via the memory interface 14 together with a write control signal, whereby the first byte data is written to the cluster of interest. Then, the controller 18 sequentially writes data to the cluster byte by byte while sequentially incrementing the address.

On writing all the picture data in the cluster of interest, the controller 18 verifies the data (step 110) . If all the picture data have been correctly written to the cluster as determined in the step 110, the controller 18 writes, for example, a serial number in the ID field 30 of the supervisory subarea, a start cluster in the field 34, and an end cluster in the field 35. Then, the program advances to a step 112. When the controller 18 finds an error in the written data by the verification, step 110, it repeats the verification several times and, if all the results are erroneous, determines that the cluster of interest is faulty. In this case, to register the faulty cluster at the directory area 22, the controller 18 rewrites the ID field 30 of the supervisory subarea of interest to "0000" (step 114). At the same time, the controller 18 copies the supervisory information written in the step 106 in the next supervisory subarea and writes the picture data written in the step 108 again in the next, cluster. The controller 18 again executes verification with the picture data written to the next cluster and, if they are correct, advances to the step 112 after writing an occupancy code in the field 30 of the new supervisory subarea and cluster addresses in the subsequent fields 34 and 35. In the step 112, the controller 12 determines whether or not all the data have been written to the EEPROM 16. If the answer of the step 112 is positive, the program ends; if otherwise, the program returns to the step 110.

Figure 5:
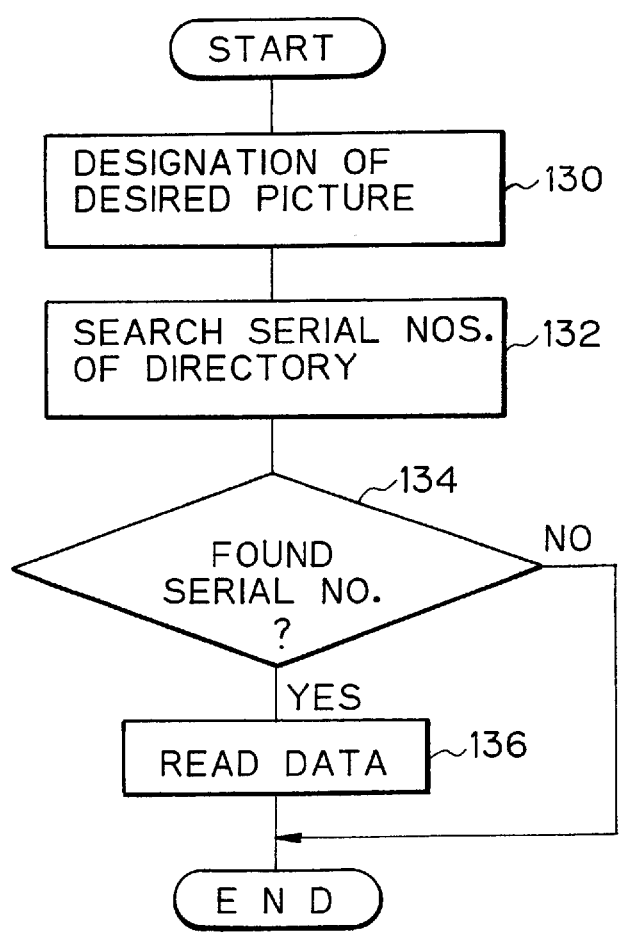

FIG. 5 is a flowchart representative of a search and playback mode operation. As shown, as a playback device 72 designates a particular picture stored in the memory card 10 (step 130), the controller 18 of the card 10 scans the serial numbers stored in the ID fields 30 of the supervisory subareas of the directory area 22 (step 132). On finding a serial number representative of the desired picture, (step 134), the controller 18 reads all the picture data associated with the serial number 30 out of the EEPROM 16. If such a serial number is absent in the directory area 22 as determined in the step 134, the controller 18 ends the search and playback mode routine.

As stated above, the illustrative embodiment defines supervisory subareas in the directory area 22 each corresponding to respective one of the clusters of the data area 24, and writes a serial number or similar occupancy code in the leading field of each supervisory subarea in the event of writing data. With the embodiment, therefore, it is not necessary to rewrite the supervisory information in the directory area 22 every time data is written to the data area 24. Moreover, if the occupancy codes are implemented as serial numbers, data can be read out accurately out of the data area 24.

In summary, it will be seen that the present invention provides a storage supervising method which, when data is to be written to a memory card using a flash type EEPROM, sequentially records serial numbers or similar ID codes in the supervisory subareas of a directory area associated with a data area for writing picture data and, therefore, can readily distinguish occupied clusters and unoccupied clusters in the data area. Hence, the method can supervise picture data efficiently without supervising, for example, the last address of a recording in the directory area, i.e., without rewriting the contents of the supervisory subareas. It follows that a memory card system does not have to back up the supervisory information or to include a back-up circuit. This, coupled with the fact that the processing is simplified, reduces the load on the system and simplifies the circuit arrangement.

Figure 6:
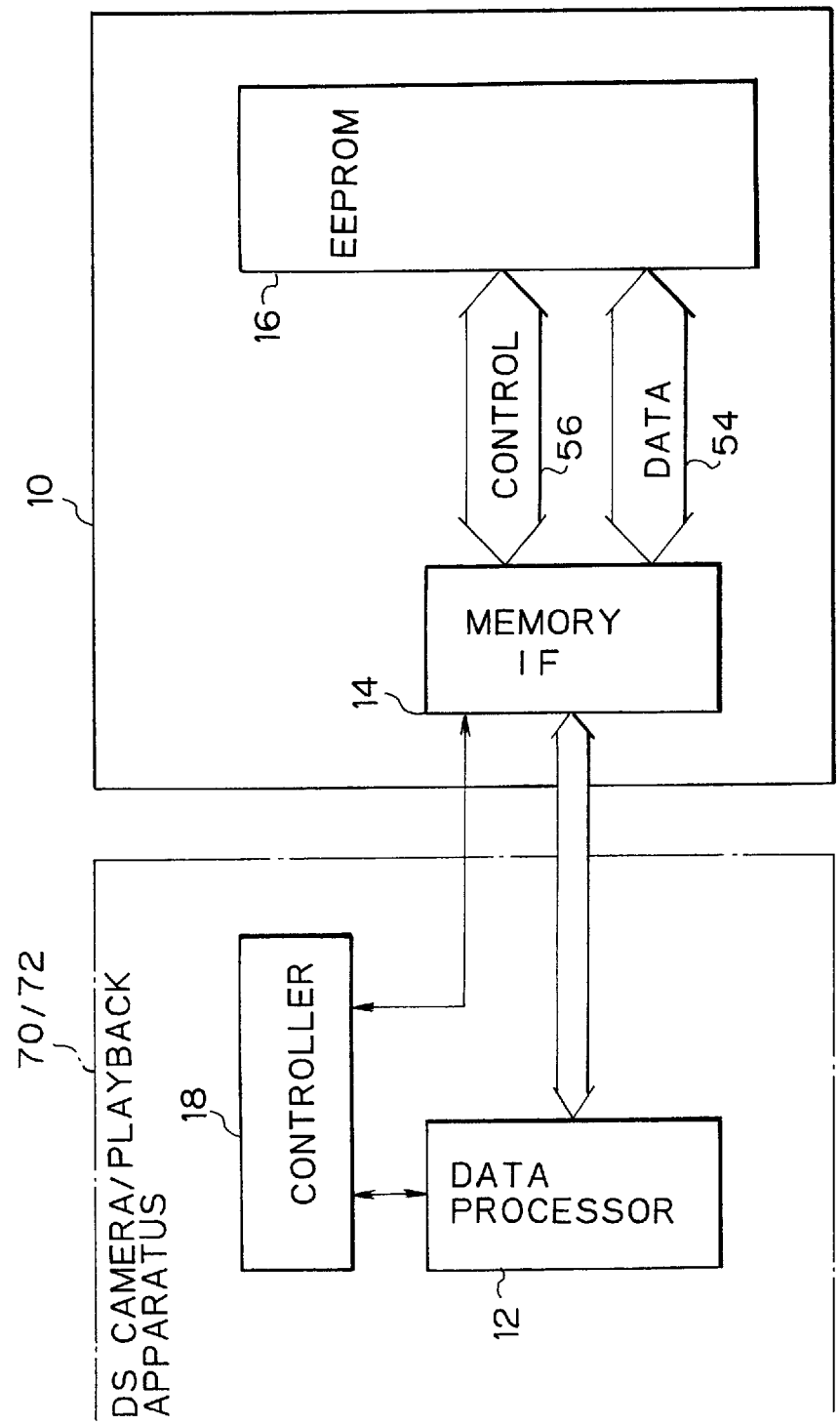
FIG. 6 shows an alternative embodiment of a memory card in accordance with the invention.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention. For example, while the embodiment has been shown and described as incorporating the data processor 12 and controller 18 in the memory card 10, they may be implemented as an adapter which is independent of and detachably connectable to the card 10 or may be built in a DS camera or similar host 70 or 72, as shown in FIG. 6.

What is claimed is:

1. In a system in which a flash type EEPROM (Electrically Erasable Programmable Read Only Memory) is adopted as a storage device for storing image data, the image data being stored on a write once basis, a method of supervising storage of data and supervisory information associated with the data in a memory card having the flash type EEPROM as a memory device, said method comprising the steps of:

formatting said EEPROM into a data area having a plurality of data subareas for storing data and a directory area having a plurality of supervisory subareas, said supervisory subareas being associated on a one-to-one basis with said plurality of data subareas for storing said supervisory information in an initialized state, contents of said EEPROM being initialized with a same value;

forming in each of said plurality of supervisory subareas an identification (ID) field for writing an occupancy code which remains in the initialized state until the data is written to an associated data subarea and which assumes a state different from the initialized state once said data is written to the associated data subarea, said different state representing the associated data subarea as being occupied said occupancy code being changed automatically without being initiated by an operator, whereby data management is carried out on a file-by-file basis so as to avoid rewriting of said supervisory subareas; and reading or writing data in or out of any one of said plurality of data subareas after determining whether or not the occupancy code exists in the ID field related to the associated data subarea.

2. A method in accordance with claim 1, wherein said writing step includes sequentially using said plurality of supervisory subareas in accordance with a sequence of addresses in said EEPROM to sequentially write data in the associated data subareas.

3. A method in accordance with claim 2, wherein said occupancy code includes a serial number to be given in accordance with the sequence of using said plurality of supervisory subareas.

4. A method in accordance with claim 1, wherein said occupancy code includes a serial number to be given in accordance with a sequence of using said plurality of supervisory subareas.

5. A method in accordance with claim 1, further comprising:

erasing the contents of said EEPROM in accordance with an erase command received from a data recording device to initialize said EEPROM.

6. A method in accordance with claim 1, further comprising:

writing the occupancy code in the ID field of each of said supervisory subareas to indicate occupancy of each of the associated data subareas for writing data in said associated data subarea.

7. A method in accordance within claim 1, wherein said step of reading or writing data includes searching the ID fields of said supervisory subareas to determine the existence of said occupancy code.

8. A method in accordance with claim 1, wherein said occupancy code is a directory number correspondingly assigned in accordance with a sequence of using said plurality of data subarea.

9. A method in accordance with claim 8, wherein said directory number is automatically changed when the data is written to a corresponding one of said subareas.

10. In a system in which a flash type EEPROM is adopted as a storage device for storing image data, the image data being stored on a write once basis, a memory card system for controlling a memory card having said flash type EEPROM as a memory device, comprising:

data converting means for converting data generated by a data recording device to a predetermined data format stored in said EEPROM or for reconverting data read out of said EEPROM to a predetermined data format being compatible with the data reproducing device;

interfacing means for interfacing said data converting means with said EEPROM to transfer data converted by said data converting means to said EEPROM or to transfer said data read out of said EEPROM to said data converting means; and control means for controlling said data converting means and said interfacing means to write data in said EEPROM or to read data out of said EEPROM, wherein when the data is written in said EEPROM, said control means erases contents of said EEPROM in accordance with an erase command sent from said data recording device to initialize said EEPROM, said control means formats said EEPROM having been initialized into a data area having a plurality of data subareas and a directory area having a plurality of supervisory subareas, each supervisory area including an ID field, said control means writes when the data is to be written to any one of said plurality of data subareas, an occupancy code having a state different from an initialized state in one of said ID fields related to an associated data area, said occupancy code including a serial number given in accordance with a sequence of accessing said plurality of supervisory subareas to sequentially write data in the associated data subareas, said occupancy code being changed automatically without being initiated by an operator, whereby data management is carried out on a file-by-file basis so as to avoid rewriting of said supervisory subareas, and said control means searches said ID fields to determine whether or not said occupancy code exists in said ID fields.

11. A system in accordance with claim 10, wherein said data converting means and said control means are built-in on said memory card.

12. A system in accordance with claim 10, wherein said data converting means and said control means are built-in on an attachment which is removable from said memory card.

13. A system in accordance with claim 10, wherein said data converting means and said control means are built-in on either said data recording device or said data reproducing device.

14. A system as claimed in claim 10, wherein said data recording device comprises a digital still camera and said data comprises picture data.

15. A system in accordance with claim 10, wherein said control means automatically changes the serial number of said occupancy code when the data is written to a corresponding one of said data subareas.

* * * * *